United States Patent
Webb et al.

(10) Patent No.: US 9,269,393 B1
(45) Date of Patent: Feb. 23, 2016

(54) ELECTRONIC SYSTEM WITH DATA REFRESH MECHANISM AND METHOD OF OPERATION THEREOF

(71) Applicant: Western Digital Technologies, Inc., Irvine, CA (US)

(72) Inventors: Steven L. Webb, Trabuco Canyon, CA (US); Chun Sei Tsai, Tustin, CA (US); Anthony L. Pei, Irvine, CA (US); Carl E. Barlow, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/563,871

(22) Filed: Dec. 8, 2014

(51) Int. Cl.
| | |
|---|---|
| G11B 5/09 | (2006.01) |
| G11B 20/10 | (2006.01) |
| G11B 27/36 | (2006.01) |

(52) U.S. Cl.
CPC ............... *G11B 20/10* (2013.01); *G11B 27/36* (2013.01); *G11B 2020/10898* (2013.01)

(58) Field of Classification Search
CPC .... G11B 27/36; G11B 5/012; G11B 2220/90; G11B 20/10009; G11B 27/3027
USPC ................. 360/77.01, 75, 31, 39, 48, 53, 72.2
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |

(Continued)

*Primary Examiner* — Nabil Hindi

(57) ABSTRACT

An apparatus includes: a media; a head configured to write data on the media; a read channel, coupled to the head, configured to detect servo data from the media; and control circuitry, coupled to the read channel, configured to: generate a position error signal (PES), associated with a write operation of an aggressor track, from the servo data, compare a first threshold to the PES for detecting a write unsafe condition, compare a second threshold, within the first threshold, to the PES for detecting a write squeeze condition, and control a refresh operation of a victim track based on at least one of the comparisons.

24 Claims, 4 Drawing Sheets

(56) References Cited

U.S. PATENT DOCUMENTS

| | | |
|---|---|---|
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,984 B1 | 8/2002 | Alex |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,628,466 B2 | 9/2003 | Alex |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |

(56) References Cited

U.S. PATENT DOCUMENTS

| | | |
|---|---|---|
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,196,860 B2 | 3/2007 | Alex |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,477,465 B2 | 1/2009 | Yu |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |

(56) References Cited

U.S. PATENT DOCUMENTS

| | | |
|---|---|---|
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 * | 12/2013 | Champion et al. .............. 360/31 |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

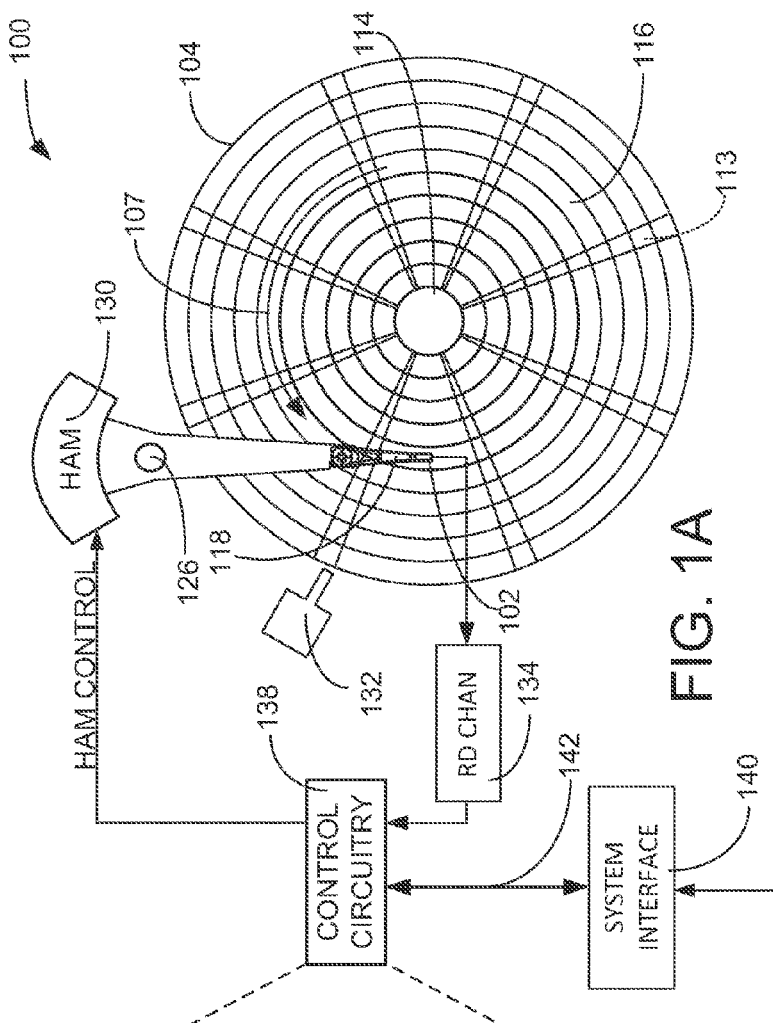
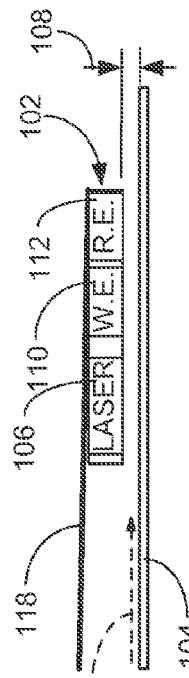
FIG. 1A
FIG. 1B
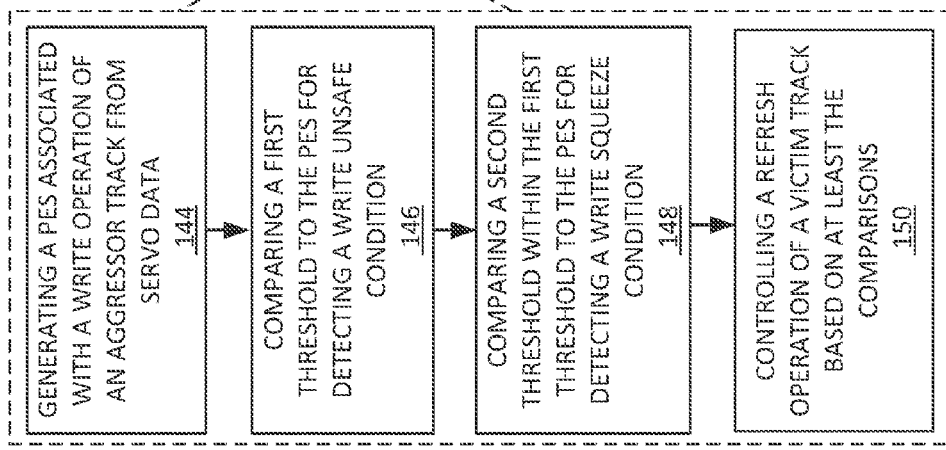
FIG. 1C

ELECTRONIC SYSTEM WITH DATA REFRESH MECHANISM AND METHOD OF OPERATION THEREOF

TECHNICAL FIELD

An embodiment relates generally to an electronic system, and more particularly to a system for data refresh in data storage systems.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

Different approaches have been used to monitor the general condition of the stored data. With increasing areal density trade-offs are increasingly difficult and challenging to make. The primary purpose, of course, is to maintain high level of signal to noise ratio (SNR) for a given design with ever shrinking track pitch and the ability to stay on-track without increasing servo wedge overhead. In principle, the higher the track per inch (TPI) density, the harder it is to stay on-track without increasing the number of servo wedges, which increases the incidence of servo positional error signal (PES) related write aborts and potential adjacent track writes/corruptions.

A conventional defense to combat this type of data loss is to make the write unsafe (WUS) limit, which is used to abort a write, as small as possible without severely degrading write performance. With ever increasing TPI this capability can only shrink. Furthermore, similar condition can be created even without write abort. As long as there are small off-track writes (still within WUS limit), the adjacent track will likely be compromised.

BRIEF DESCRIPTION OF THE DRAWINGS

FIGS. 1A, 1B, and 1C show an operational diagram of an electronic system with data refresh according to one of the embodiments.

DETAILED DESCRIPTION

Figure 2:
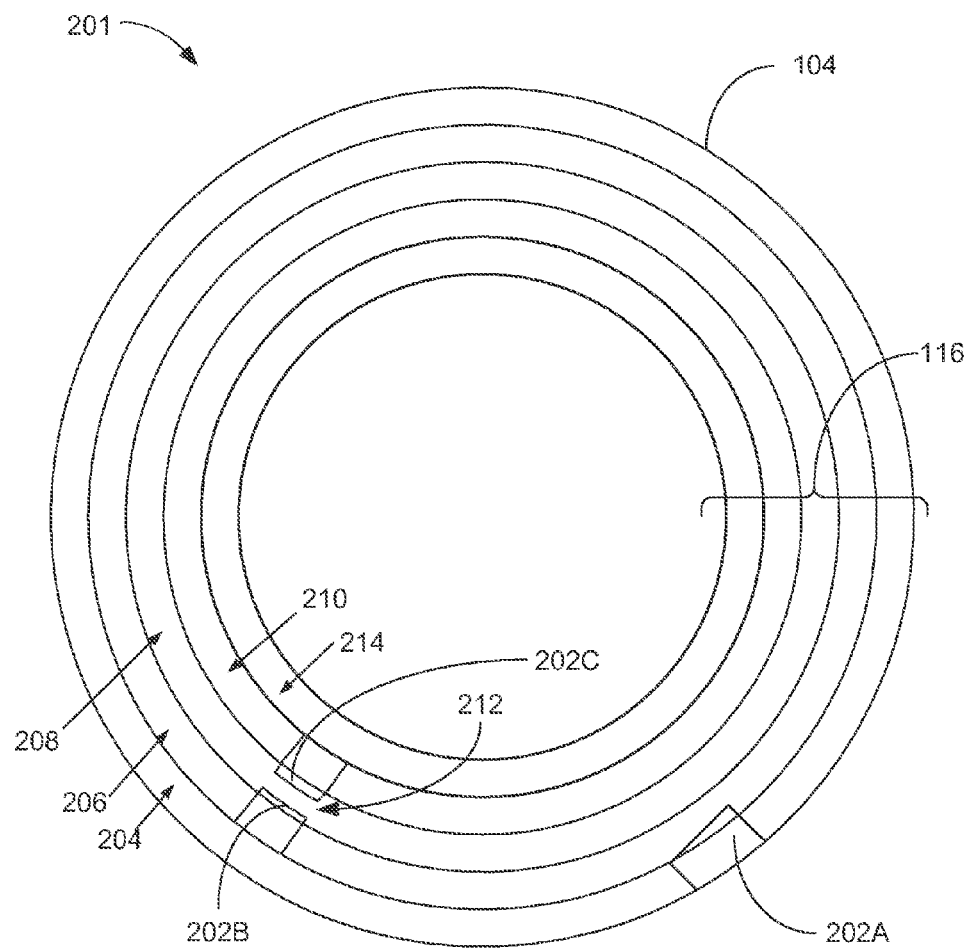
FIG. 2 provides an exemplary layout of a track group mechanism in an embodiment.

Storage systems can include storage devices, such as hard disk drives (HDD), solid state drives (SSD), hybrid drives, and optical storage devices. In order to maintain data integrity many of the storage devices perform off-line or background data verification and maintenance processes. These processes are typically interleaved with interface operations in order to minimize the latency seen by the storage system host.

While the background data verification and maintenance activity (collectively, "background scan activity") is extremely beneficial, it nevertheless contributes to head wear and increased power consumption. Contemporary HDDs have shown over 60% of failed drives are due to head wear, as a result of excessive usage. As a result, a trade-off can be made in order to strike a balance between maintaining data integrity and over usage.

Some embodiments solve at least this problem by using the actual user reads in place of the background scan, thereby minimizing the needs to actually doing background scan. This mechanism can reduce the need to excessively scan the disk while in idle, thus extending the longevity of the data storage device by minimizing head wear/damage caused by the background scan. Further embodiments can also utilize media area reserved for system access, such as reserved space or boot sectors, without the need for background scan in the system spaces.

A need still remains for an electronic system as various embodiments with data management mechanisms for providing reliable data storage while not prematurely wearing out the head. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes can be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation.

Referring now to FIGS. 1A, 1B, and 1C, therein are shown an operational diagram of an electronic system 100 according to an embodiment. The electronic system 100 can represent an apparatus for one various embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media-based storage.

In an embodiment the electronic system 100 includes a head 102 flying over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a head actuation motor 130 can be a voice coil motor assembly, a stepper motor assembly, or a combination thereof. The head actuation motor 130 can generate a torque or force for positioning the head 102.

A tapered end of the flex arm 118 can include the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions or detect magnetic transitions from the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer user data 142 between the host electronics and the control circuitry 138. The user data 142 can be encoded or decoded by the control circuitry 138 in preparation for transfer to or from the media 104.

The control circuitry 138 can be configured to control the spindle motor 114 for adjusting the speed 107 of the media 104. The control circuitry 138 can be configured to cause the head 102 to move relative to the media 104, or vice versa. The media 104 can include a plurality of servo wedges 113 that allow the control circuitry 138 to position the head 102 relative to data tracks 116. The control circuitry 138 can also be configured to control the flow of information to the head 102 for writing to the data tracks 116 of the media 104. The information sent to the head 102 can include the preconditioning pattern, direct current erase signals, user data, or a combination thereof.

In one embodiment, the electronic system 100 further comprises control circuitry 138 configured to execute the flow diagrams of FIG. 1C. As an example, blocks 144 to 150 can represent the flow diagram where an embodiment is employing a data management mechanism for maintaining data integrity.

Block 144 shows generating a position error signal (PES), associated with a write operation of an aggressor track, from the servo data. It is understood that the servo data is located in the servo wedges 113 and identifies the intended location of the data tracks 116. For the purpose of this disclosure, an aggressor track is a data track being written to in a write operation, during which encroachment to one or more tracks adjacent to the aggressor tracks may result. Those track(s) encroached upon are termed victim track(s).

Block 146 shows comparing a first threshold to the PES for detecting a write unsafe condition. In one embodiment, the detection of a write unsafe condition means that the data being written on a selected track has encroached on the track boundary and could be writing on an adjacent track by mistake.

Block 148 shows comparing a second threshold, within the first threshold, to the PES for detecting a write squeeze condition. The detection of a write squeeze condition means the writing of the selected track has approached the track boundary and the adjacent track might be impacted or corrupted. In one embodiment, the first threshold is greater in magnitude than the second threshold and thus the second threshold is said to be within a range of value covered by the first threshold, hence "within" the first threshold. In other embodiments, the relationship of the thresholds may be different (e.g., reversed), based on design and how PES is measured.

Block 150 shows controlling a refresh operation, of a victim track, based on at least one of the comparisons. A refresh operation of a victim track may require retrieving or reconstructing the data that was corrupted by the detection of the write squeeze or the write unsafe. The refresh of the data can allow the victim track to be rewritten in its original location, or moved to a different storage location.

It has been discovered that an embodiment of the electronic system 100 can provide a data refresh process in order to maintain the robustness of the data written to the data tracks 116 of the media 104. In one embodiment, any data that shows data errors or requires bit corrections can be isolated as a victim of adjacent track writes. The management of the refresh process for data that has been impacted by the adjacent track writes can be selectively triggered by the use of one or more PES thresholds by the control circuitry 138.

Referring now to FIG. 2, therein is shown an exemplary layout of a track group mechanism 201 in an embodiment. The exemplary layout of the track group mechanism 201 depicts the media 104 having a plurality of data tracks 116 partitioned adjacent to each other across the surface of the media 104. The data tracks 116 can be within a zone or a specific region of the data tracks 116 addressed by write operations.

In one embodiment, the media 104 can be partitioned into a plurality of groups 201, each one of the plurality of groups 201 can include the data tracks 116 or portions of the data tracks 116, which can also be referred to as wedges, sectors, zones, zip codes, data pages, super blocks, or bulk pages. By way of an example, five of the data tracks 116 are shown although it is understood that the entire capacity of the media 104 can be divided into the data tracks 116.

In an example embodiment, five of the data tracks 116 can be shown to demonstrate the type of adjacent track write errors that are possible within the electronic system 100 of FIG. 1A. It is understood that the data track 116 can also include a number of the servo wedges 113 of FIG. 1A that are not shown.

An example of an adjacent track write error 202A can be caused by lack of control of the head actuation motor 130, which can be due to residual inertia from a reposition of the head 102 of FIG. 1A, debris blocking the movement of the head 102, an environmental shock or vibration, or a combination thereof. The adjacent track write error 202A can be initiated on a first data track 204 positioned toward the outer diameter of the media 104. The adjacent track write error 202A can wander into a second data track 206 positioned adjacent to the first data track 204. The data that was previously written in the second data track 206 can be corrupted by the adjacent track write error 202A. The control circuitry 138 of FIG. 1A can detect the movement of the head 102 into the second data track 206 in order to abort the write operation by activating a write unsafe error.

In another example of the adjacent track write error 202B, a write operation to the second data track 206 can encroach a third data track 208. In the write operation of the second data track 206, a minor mis-position of the head 102 can go undetected by the control circuitry 138 but can alter the previously written data on the third data track 208 positioned adjacent to the second data track 206. With a minor encroachment of the previously written data of the third data track 208, caused by the write of the second data track 206, a data error might not be detected and the third data track 208 can be read normally. In a subsequent write operation of a fourth data track 210, a second minor encroachment 202C of the previously written data of the third data track 208 can create a write squeeze condition 212. The write squeeze condition 212 can sufficiently corrupt the previously written data of the third data track 208 to make it unreadable. In both instances the control circuitry 138 must provide a method to refresh the data that was corrupted by the encroachments. The write squeeze 212 can be difficult to detect because a position error signal (PES) in each encroachment 202B and 202C might be minor enough as to not activate a write unsafe condition. However, the combined effect may cause loss of data in the write squeeze condition 212 on the third data track 208.

In recovering from the write squeeze condition 212, the control circuitry 138 can perform a background task for refreshing the previously written data of the victim track, such as the third data track 208. The background task can reread the data at the site of the write squeeze condition 212 in order to correct the data, or the control circuitry can obtain the data already resident in a cache memory. The corrected data can be written in the original track location in the victim track or it can be relocated to a reserved space data track 214.

The reserved space data track 214 can be a fifth data track for moving any of the data that can be corrupted by any of the adjacent track write error 202. The reserved space data track 214 can be excess space beyond the user identified capacity of the media 104. It is understood that the positions of the data tracks 116 is an example only and any of the data tracks 116 in the media can be subject to the adjacent track write error 202. The position of the reserved space data track 214 is an example only and can be positioned anywhere in the media 104.

It is understood that the control circuitry 138 can establish a threshold for the PES that can detect the adjacent track write error 202 when the head 102 crosses into an adjacent or victim track. The detection of the write squeeze condition 212 can be more difficult to detect because it requires the recognition of multiple minor encroachments at the same radial position of the media. It is understood that, in one embodiment, each of the adjacent data tracks 116 can have an initial sector that is a linear offset from the last sector of the adjacent data track 116. The linear offset can allow a single track seek and settle prior to reaching the initial sector in order to optimize sequential write performance.

Figure 3:
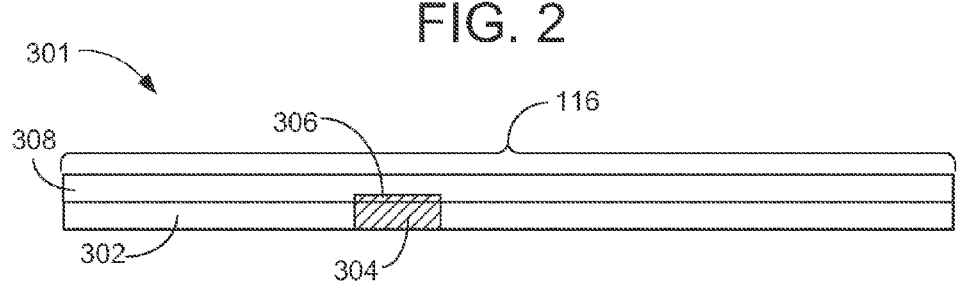
FIG. 3 is an exemplary layout of adjacent data tracks in an embodiment.

Referring now to FIG. 3, therein is shown an exemplary layout of adjacent data tracks 301 in an embodiment. The exemplary layout of the adjacent data tracks 301 can be substantially the same as one of the data tracks 116 of FIG. 1A.

In an embodiment, an aggressor track 302 can be the target of a sector write 304. A track encroachment 306 can be caused by debris on the media 104, residual inertia from a seek operation, an environmental shock or vibration. The track encroachment 306 can be of sufficient magnitude to corrupt the previously written data on a victim track 308. By way of an example, most instances of the track encroachment 306 can exist without alerting the control circuitry 138 or impacting the previously written data of the victim track 308. In some instances of the track encroachment 306, the control circuitry 138 can detect a write unsafe condition that indicates the head 102 has crossed into the victim track 308 and possibly corrupted the previously written data in the area of the track encroachment 306.

It is understood that the aggressor track 302 and the victim track 308 can have any adjacent orientation. The track encroachment 306 must occur during a write operation and can occur in any portion of the data track 116. It is further understood that the track encroachment 306 can be detected as a write unsafe condition or a write squeeze condition when the head 102 enters into the space of the victim track 308.

Figure 4:
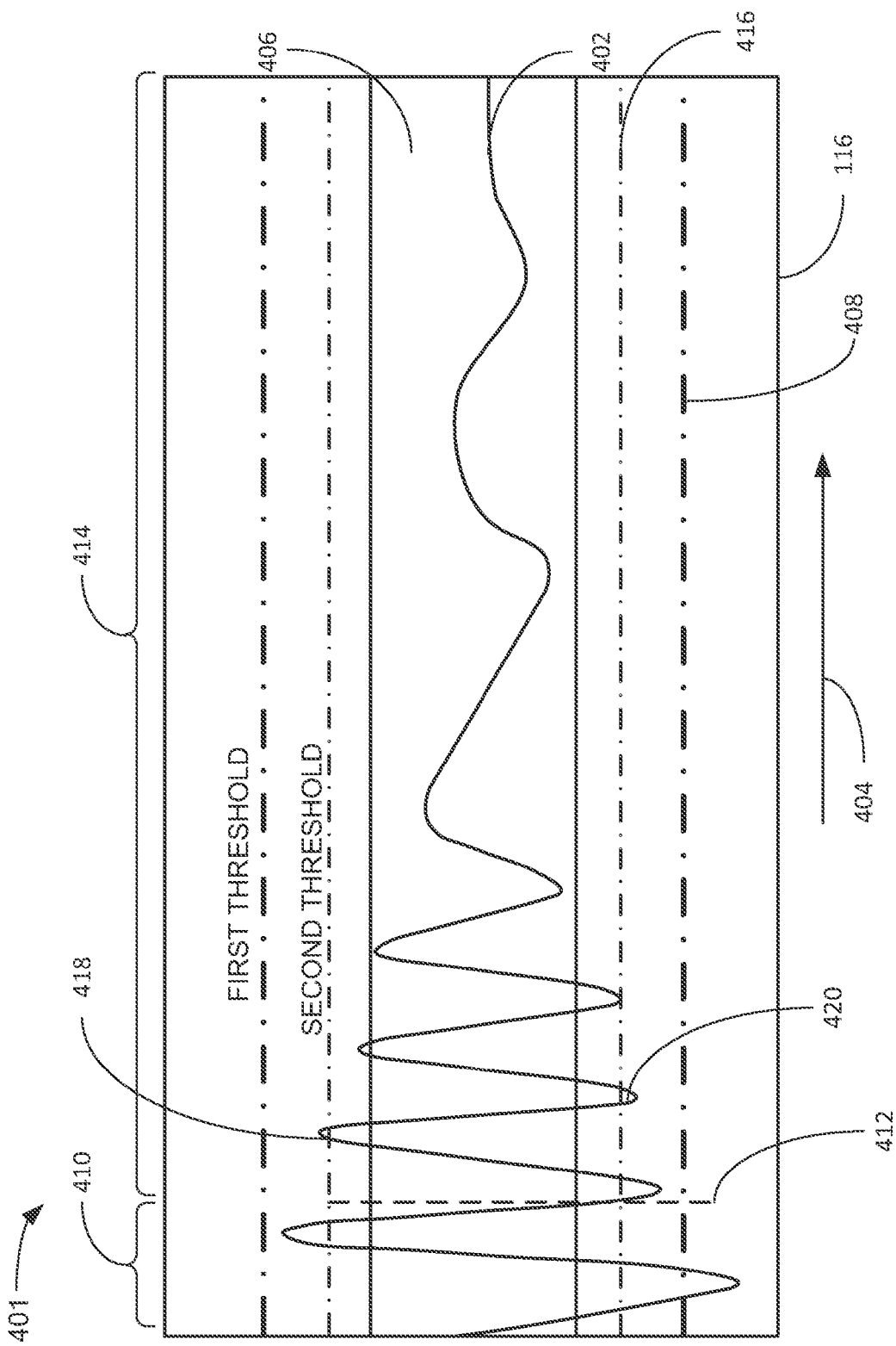
FIG. 4 provides an exemplary graphical representation of repositioning of the head on the data track in an embodiment of the electronic system of FIG. 1A.

Referring now to FIG. 4, therein is shown an exemplary graphical representation 401 of repositioning of the head 102 of FIG. 1A on the data track 116 in an embodiment of the electronic system 100 of FIG. 1A. The exemplary repositioning of the head 102 on the data track 116 depicts a position error signal (PES) 402 for a seek and settle on the data track 116 in an embodiment of the electronic system 100. In one embodiment, the control circuitry 138 of FIG. 1A can perform a seek operation to one of the data tracks 116. Upon arriving at the data track 116, the PES 402 can be damped, such as having reduced amplitude from the center of the data track 116 as the head 102 moves in a first direction 404.

A track center 406 can be the region in which the position of the head 102, as indicated by the PES 402, can remain within the bounds of the data track 116. A first threshold 408 can be compared to the absolute value of the PES 402 for detecting a write unsafe condition during the write operation. In a mathematical sense, it is understood that the absolute value of the PES 402 during a pre-write settle 410 can have any value without setting an error condition. A write start 412 can mark the assertion of write gate to the head 102 by the control circuitry 138 and the monitoring of the location of the head 102 within the data track 116.

A write operation 414 can represent the critical time that the head 102 is actively altering the data on the media 104 of FIG. 1A. A second threshold 416, within the first threshold 408, can provide an early warning that the head 102 can be entering the space of a victim track (such as in the encroachment scenario of the victim track 308 of FIG. 3). An outer diameter drift (ODD) 418 can be detected when the value of the PES 402 is positive and exceeds the absolute value of the second threshold 416 during the write operation 414. The control circuitry 138 can record the location and direction of the victim track 308 during the ODD 418 for a background data refresh operation.

An inner diameter drift (IDD) 420 can be detected when the value of the PES 402 is negative and exceeds the absolute value of the second threshold 416 during the write operation 414. The control circuitry 138 can record the location and direction of the victim track 308 during the IDD 420 for future check conditions. In one embodiment, a write squeeze condition is detected when the control circuitry 138 detects the ODD 418 and the IDD 420 at a similar location of the victim track 308. This is similar to the previously described scenario in track 208 of FIG. 2. The write squeeze condition 212 of FIG. 2 is detected when a single victim track 208 is encroached by the aggressor tracks 206 and 210 of FIG. 2 from both sides of the victim track 208. The recording of locations and directions associated with the IDD and ODD events can enable tracking of write squeeze conditions and triggering of corrective actions.

It is understood that the control circuitry 138 can detect a direction of the victim track 308 based on the sign of the PES 402 when the first threshold 408 or the second threshold 416 is exceeded. The control circuitry 138 can maintain a count of the ODD 418 and the IDD 420 that occur on the victim track 308 and the data refresh operation can be prioritized based on the count. Depending on the threshold used to detect IDD or ODD (or any encroachment action in general), a different weight may be assigned to the count to influence the timing at which a corrective action is triggered. For example, a write with PES within the second threshold 416 may receive a count of N, while a write with PES exceeding the second threshold 416 but less than the first threshold 408 may receive a count of W1*N, where W1 is a weight multiplier, and a write with PES exceeding the first threshold 408 may receive a count of W2*N, where W2 is a weight multiplier greater than W1.

In one embodiment, a pre-defined aggregate threshold based on the weights and/or counts that are tracked over a period of time can be used to trigger the corrective action(s). The aggregate threshold may be set, for instance, to trigger corrective action(s) when a tracked (weighted) count exceeds the aggregate threshold for a track, or for a group of tracks. In one embodiment, corrective actions may be triggered based more generally on tracked events such as the first/second PES thresholds being exceeded, apart from the example weighted count schemes described above.

Corrective actions may take many forms. For example, the control circuitry 138 can monitor the occurrence of the ODD 418 and the IDD 420 in order to adjust the pre-write settle 410. By increasing the pre-write settle 410, a reduced number of the ODD 418 and the IDD 420 can be achieved. In another example, the control circuitry 138 can perform a data refresh operation in order to verify, restore, or relocate the data on the victim track 308. If the data from the victim track 308 must be relocated, it can be written on the same data track 116 or it can be moved to the reserved space data track 214 of FIG. 2. In yet another example, additional writes to a track or group of tracks where the pre-defined aggregate threshold has been exceeded may be deferred until a corrective data refresh operation has been performed. Also, a combination of these corrective actions may be performed in some embodiments. Also, depending on the embodiments, the corrective actions may take place as background tasks or be performed substantially immediately.

It is understood that the position of the first threshold 408 and the second threshold 416 within the data track 116 is an example only. It is also understood that additional thresholds can be implemented as the width of the data track 116 continues to shrink and the position of the head 102 becomes increasingly critical.

Figure 5:
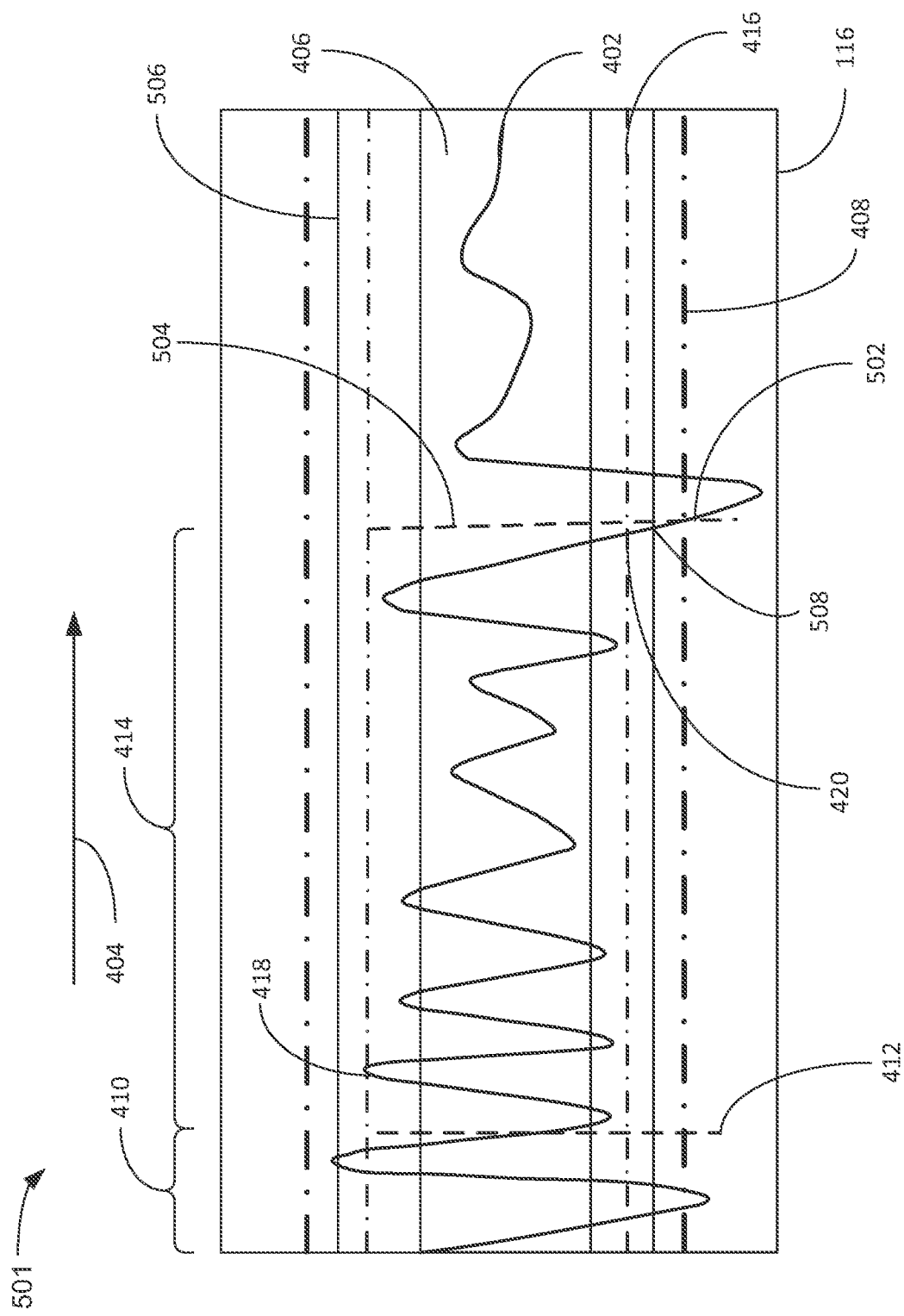
FIG. 5 provides an exemplary graphical representation of repositioning of the head on the data track in an embodiment of the electronic system of FIG. 1A.

Referring now to FIG. 5, therein is shown an exemplary graphical representation 501 of repositioning of the head 102 of FIG. 1A on the data track 116 in an embodiment of the electronic system 100 of FIG. 1A. The exemplary graphical representation 501 depicts the detection of a write unsafe condition 502.

The exemplary repositioning of the head 102 on the data track 116 depicts the PES 402 for a seek and settle on the data track 116 in an embodiment of the electronic system 100. In one embodiment, the control circuitry 138 of FIG. 1A can perform a seek operation to one of the data tracks 116. Upon arriving at the data track 116, the PES 402 can be damped, such as having reduced amplitude from the center of the data track 116 as the head 102 moves in the first direction 404.

The track center 406 can be the region in which the position of the head 102, as indicated by the PES 402, can remain within the bounds of the data track 116. The first threshold 408 can be compared to the absolute value of the PES 402 for detecting the write unsafe condition 502 during the write operation 414. It is understood that the absolute value of the PES 402 during the pre-write settle 410 can have any value without setting an error condition. By extending the duration for pre-write settle 410, the head 102 can be less susceptible to exceeding the second threshold 416 and the first threshold 408. The write start 412 can mark the assertion of write gate to the head 102 by the control circuitry 138 and the monitoring of the location of the head 102 within the data track 116.

The write operation 414 can represent the head 102 actively altering the data on the media 104 of FIG. 1A. The second threshold 416, within the first threshold 408, can provide an early warning that the head 102 can be entering the space of the victim track 308 of FIG. 3. The outer diameter drift (ODD) 418 can be detected when the value of the PES 402 is positive and exceeds the second threshold 416 during the write operation 414. The control circuitry 138 can record the location and direction of the victim track 308 during the ODD 418 for future check conditions. When the PES 402 exceeds the second threshold 416 and continues to exceed the first threshold 408, the write unsafe condition 502 is detected. The assertion of the write unsafe condition 502 can cause a write terminate 504 to be initiated. The write terminate 504 can negate the write gate to the head 102 in order to stop any further damage to the victim track 308 and pause the write operation 414. The write terminate 504 can initiate an immediate refresh operation of the data on the victim track 308 prior to completing the paused write operation 414.

The inner diameter drift (IDD) 420 can be detected when the value of the PES 402 is negative and its absolute value exceeds the second threshold 416 during the write operation 414. The control circuitry 138 can record the location and direction of the victim track 308 during the IDD 420 for future processing.

It is understood that the control circuitry 138 can detect a direction of the victim track 308, relative to the aggressor track, based on the sign of the PES 402 when the first threshold 408 or the second threshold 416 is exceeded. It is understood that the position of the first threshold 408 and the second threshold 416 within the data track 116 is an example only. It is also understood that additional thresholds can be implemented as the width of the data track 116 continues to shrink and the position of the head 102 becomes increasingly critical.

For example, a third threshold 506 can be positioned between the first threshold 408 and the second threshold 416. The third threshold 506 can indicate the position of the head 102 as it starts an off-track write 508. The position of the third threshold 506 can be dependent on the physical dimensions of the head 102 and the data track 116. The control circuitry 138 can add the location detected as the off-track write 508 to a track count for the background data refresh operation. The off-track write 508 is considered more damaging that the ODD 418 or the IDD 420 because the head 102 is known to have altered the data on the victim track 308. The off-track write 508 is less damaging than the write unsafe condition 502 because the head 102 does not travel as far into the victim track 308 on the off-track write 508.

The control circuitry 138 can assign different weights to each of the conditions. The control circuitry 138 can perform a background data refresh operation in order to verify, restore, or relocate the data on the victim track 308 as a result of the off-track write, the ODD 418, and the IDD 420. The off-track write 508 can be assigned a greater weight to the ODD 418 or the IDD 420, because there is a higher probability of data corruption on the victim track 308. If the data from the victim track 308 must be refreshed, it can be written on the same data track 116 or it can be moved to the reserved space data track 214 of FIG. 2. Any occurrence of the write unsafe condition 502 requires an immediate data refresh operation to recover the data on the victim track 308.

The electronic system 100 has been described with module functions or order as an example. The electronic system 100 can partition the modules differently or order the modules differently. For example, the sequence of actions shown in FIG. 1C may be different in some embodiments, with some actions omitted and/or combined. As another example, the LBA number could be derived from the servo wedges 113 information read from the data track 116 on the media 104 and passed through the read channel 134 of FIG. 1A. As yet another example, while the description of various embodiments uses the examples of the data tracks 116 from a magnetic rotating media, some embodiments are applicable to data stored on any media, including blocks/pages of data stored in solid-state memory.

The modules described in this application can be implemented as instructions stored on a non-transitory computer readable medium to be executed by the control circuitry 138 in the electronic system 100. The non-transitory computer medium can include the memory of the integrated circuit in the electronic system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In addition, any of the above described modules and components may be implemented in firmware, software, hardware, or any combination thereof.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
    a media;
    a head configured to write data on the media;
    a read channel, coupled to the head, configured to detect servo data from the media; and
    control circuitry, coupled to the read channel, configured to:
        generate a position error signal (PES), associated with a write operation of an aggressor track, from the servo data,
        compare a first threshold to the PES for detecting a write unsafe condition,
        compare a second threshold, within the first threshold, to the PES for detecting a write squeeze condition, and
        control a refresh operation of a victim track based on at least one of the comparisons.

2. The apparatus as claimed in claim 1 wherein the control circuitry is further configured to refresh sectors of data of the victim track when the PES exceeds the first threshold.

3. The apparatus as claimed in claim 1 wherein the control circuitry is further configured to refresh data of the victim track, before completing any other write command, when the PES exceeds the first threshold.

4. The apparatus as claimed in claim 1 wherein the control circuitry is further configured to:
    identify the victim track when the PES exceeds the first threshold; and
    refresh data of the victim track in a background task.

5. The apparatus as claimed in claim 1 wherein the control circuitry is further configured to:
    identify the victim track when the PES exceeds the second threshold; and
    refresh data of the victim track in a background task.

6. The apparatus as claimed in claim 1 wherein the control circuitry is further configured to detect an inner diameter drift (IDD), an outer diameter drift (ODD), or a combination thereof from the PES.

7. The apparatus as claimed in claim 1 wherein the control circuitry is further configured to track a count based at least in part on one or more of:
    a detected write unsafe condition; and
    a detected write squeeze condition.

8. The apparatus as claimed in claim 7 wherein the control circuitry is further configured to compare a third threshold, within the first threshold, to the PES for detecting an off-track write condition, and the count is additionally based on the detected off-track write condition.

9. The apparatus as claimed in claim 7 wherein the control circuitry is further configured to assign different weights to the detected write unsafe condition and write squeeze condition.

10. The apparatus as claimed in claim 7 wherein the control circuitry is further configured to control refresh of sectors of data in the victim track based at least in part on the count.

11. The apparatus as claimed in claim 7 wherein the control circuitry is further configured to calibrate a seek-settle time based at least in part on the count.

12. The apparatus as claimed in claim 7 wherein the control circuitry is further configured to extend a seek-settle time when executing a background task based at least in part on the count.

13. A method of operating an apparatus, the method comprising:
    generating a position error signal (PES), associated with a write operation of an aggressor track, from servo data;
    comparing a first threshold to the PES for detecting a write unsafe condition;
    comparing a second threshold, within the first threshold, to the PES for detecting a write squeeze condition; and
    controlling a refresh operation, of a victim track, based on at least one of the comparisons.

14. The method as claimed in claim 13 further comprising refreshing sectors of data of the victim track when the PES exceeds the first threshold.

15. The method as claimed in claim 13 further comprising refreshing data of the victim track, before completing any other write command, when the PES exceeds the first threshold.

16. The method as claimed in claim 13 further comprising:
    identifying the victim track when the PES exceeds the first threshold; and
    refreshing data of the victim track in a background task.

17. The method as claimed in claim 13 further comprising:
    identifying the victim track when the PES exceeds the second threshold; and
    refreshing data of the victim track in a background task.

18. The method as claimed in claim 13 further comprising detecting an inner diameter drift (IDD), an outer diameter drift (ODD), or a combination thereof from the PES.

19. The method as claimed in claim 13 further comprising tracking a count based at least in part on one or more of:
    detecting a write unsafe condition; and
    detecting a write squeeze condition.

20. The method as claimed in claim 19 further comprising comparing a third threshold, within the first threshold, to the PES for detecting an off-track write condition, and the count is additionally based on detecting the off-track write condition.

21. The method as claimed in claim 19 further comprising assigning different weights to detecting the write unsafe condition and the write squeeze condition.

22. The method as claimed in claim 19 further comprising controlling refresh of data in the victim track based at least in part on the count.

23. The method as claimed in claim 19 further comprising calibrating a seek-settle time based at least in part on the count.

24. The method as claimed in claim 19 further comprising extending a seek-settle time when executing a background task based at least in part on the count.

* * * * *